United States Patent
Todd et al.

(10) Patent No.: US 12,390,053 B2
(45) Date of Patent: Aug. 19, 2025

(54) SYSTEMS FOR CUTTING BOARDS IN RECREATIONAL VEHICLES

(71) Applicant: Haier US Appliance Solutions, Inc., Wilmington, DE (US)

(72) Inventors: Justin Patrick Todd, Louisville, KY (US); Michael Robin Blackwood, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 402 days.

(21) Appl. No.: 17/983,015

(22) Filed: Nov. 8, 2022

(65) Prior Publication Data
US 2024/0148193 A1    May 9, 2024

(51) Int. Cl.
A47J 47/00    (2006.01)
A47J 47/16    (2006.01)
B60P 3/36     (2006.01)

(52) U.S. Cl.
CPC ........... *A47J 47/005* (2013.01); *A47J 47/16* (2013.01); *B60P 3/36* (2013.01)

(58) Field of Classification Search
CPC . A47J 47/16; A47J 47/005; B60P 3/36; B60P 3/34; F24C 15/12; B60N 3/16; A47B 77/04
USPC ....................................... 269/289 R; D7/698
See application file for complete search history.

(56) References Cited

U.S. PATENT DOCUMENTS

| | | | | |
|---|---|---|---|---|
| 5,121,909 A | * | 6/1992 | Stickel, III | A47J 47/005 269/289 R |
| 5,331,945 A | * | 7/1994 | Somerton | F24C 15/12 269/302.1 |
| 9,687,113 B2 | * | 6/2017 | Torlai | A47J 47/005 |
| 10,184,668 B2 | * | 1/2019 | Sanquist | A47G 23/06 |
| 10,995,962 B2 | * | 5/2021 | Schillizzi | A47B 33/00 |
| 11,181,282 B2 | | 11/2021 | Bell et al. | |
| 2022/0055516 A1 | * | 2/2022 | Cordoneda | B60R 11/00 |

FOREIGN PATENT DOCUMENTS

| | | | |
|---|---|---|---|
| CN | 107554401 A | * | 1/2018 |
| CN | 210704356 U | * | 6/2020 |
| CN | 222645898 U | * | 3/2025 |

(Continued)

OTHER PUBLICATIONS

A Multifunctional Chopping Board Base Sharpener; Patent No. 210704356; Document ID: CN 210704356 U; Date Published: Jun. 9, 2020; Inventor Name: Lin, Yi-Hong; Application No. CN 201921484779 U; Date Filed: Sep. 6, 2019 (Year: 2020).*

(Continued)

*Primary Examiner* — Mahdi H Nejad
(74) *Attorney, Agent, or Firm* — Dority & Manning, P.A.

(57) ABSTRACT

A cutting board assembly for use in recreational vehicles. The cutting board assembly includes a metal tray and a board. The board is selectively mountable to the metal tray such that a bottom surface of the board faces a top surface of the metal tray. An area of the top surface of the metal tray is greater than an area of the bottom surface of the board. When the board is mounted to the metal tray and the cutting board assembly is positioned on a cooking appliance, the metal tray is positioned between the board and a heating element of the cooking appliance.

18 Claims, 6 Drawing Sheets

(56) References Cited

FOREIGN PATENT DOCUMENTS

| | | | | |
|---|---|---|---|---|
| DE | 102014005211 | A1 | * 10/2015 | .............. A47B 5/02 |
| DE | 202020101227 | U1 | 4/2020 | |
| DE | 102022110901 | A1 | * 6/2023 | .............. A47J 47/16 |
| DE | 202024001013 | U1 | * 8/2024 | |
| DE | 102024200284 | A1 | * 2/2025 | |
| EP | 0769261 | A1 | * 4/1997 | |
| EP | 3960029 | A1 | * 3/2022 | ........... A47B 77/022 |
| KR | 200332662 | Y1 | * 11/2003 | |
| KR | 200452058 | Y1 | 2/2011 | |
| KR | 20210019309 | A | * 2/2021 | |
| KR | 20210127567 | A | 10/2021 | |
| KR | 102358175 | B1 | 2/2022 | |
| KR | 20240027930 | A | * 3/2024 | |

OTHER PUBLICATIONS

A Folding Chopping Block; Patent No. 108670072; Document ID: CN 108670072 A; Date Published: Oct. 19, 2018; Inventor Name:Yu, Qian; Application No. CN 201810597860 A; Date Filed: Jun. 12, 2018 (Year: 2018).*

"Camco Silent Stovetop Cover", Camping World, 2022, Retrieved from Internet: https://www.campingworld.com/camco-silent-stovetop-cover-83402.html?utm_source=google&utm_medium=ppc&utm_campaign=%7bCampaign%7d&gclid=CjwKCAjwu_mSBhAYEiwA5BBmf939G6F_-Tmpw6Y14u-LbKGpJfA6S9vmZlyKKqMKX21g-GhJ-SgHbhoCVEUQAvD_BwE&gclsrc=aw.ds.

* cited by examiner

SYSTEMS FOR CUTTING BOARDS IN RECREATIONAL VEHICLES

FIELD OF THE INVENTION

The present subject matter relates generally to systems for cutting boards in recreational vehicles.

BACKGROUND OF THE INVENTION

Recreational vehicles (RV) are motor vehicles or trailers that include amenities such as kitchens, bathrooms, and one or more sleeping areas. Kitchens of recreational vehicles can have typical household appliances such as refrigerators, ovens, cooktops, ranges, and microwaves. Generally, kitchens in RV's have limited counterspace to store items or prepare food. Installed in the counter, ranges or cooktops in recreational vehicles can take up valuable countertop space when not being used. An additional way to use the cooktop space in an RV would be advantageous.

BRIEF DESCRIPTION OF THE INVENTION

Aspects and advantages of the invention will be set forth in part in the following description, or may be apparent from the description, or may be learned through practice of the invention.

In one example embodiment, a cutting board assembly for use in recreational vehicles. The cutting board assembly includes a metal tray and a board. The board is selectively mountable to the metal tray such that a bottom surface of the board faces a top surface of the metal tray. An area of the top surface of the metal tray is greater than an area of the bottom surface of the board. When the board is mounted to the metal tray and the cutting board assembly is positioned on a cooking appliance, the metal tray is positioned between the board and a heating element of the cooking appliance.

In another example embodiment, a cutting board assembly is configured to position atop a cooktop appliance in recreational vehicles. The cutting board assembly includes a metal tray that is configured to be positioned on the cooktop appliance and to withstand heat from the cooktop appliance. The cutting board assembly also includes a board selectively mountable to the metal tray such that a bottom surface of the board faces a top surface of the metal tray. An area of the top surface of the metal tray is greater than an area of the bottom surface of the board. When the board is mounted to the metal tray and the cutting board assembly is positioned on a cooking appliance, the metal tray is positioned between the board and a heating element of the cooking appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
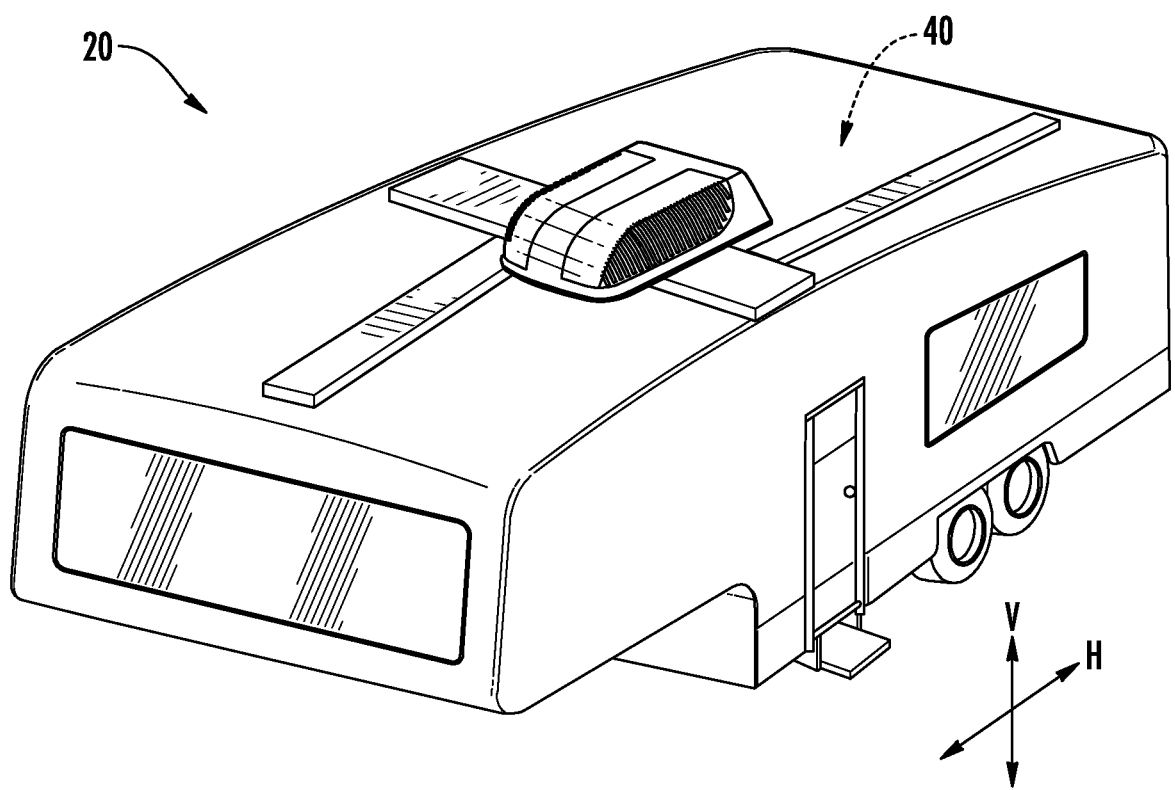
FIG. 1 provides a perspective view of an example embodiment of a recreational vehicle according to aspects of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

In general, FIG. 1 provides a perspective view of an example recreational vehicle 20 in accordance with aspects of the present disclosure. In general, recreational vehicles may be motorized (drivable) or non-motorized (towable) vehicles that are used for camping, traveling, and other recreational activities. In the current example embodiment, recreational vehicle 20 is a non-motorized recreational vehicle 20, although one of skill in the art would understand that aspects of the present subject matter may be used in either motorized or non-motorized recreational vehicles. In general, recreational vehicle 20 defines a passenger compartment 40 which may include amenities such as kitchens, bathrooms, one or more sleeping areas with beds, and multiple compartments for storing items. During use of recreational vehicle 20, people may spend significant amounts of time within passenger compartment 40. Thus, recreational vehicle 20 may be employed for a variety of purposes including transportation, cooking, eating, sleeping, entertaining, and more of the like.

Figure 2:
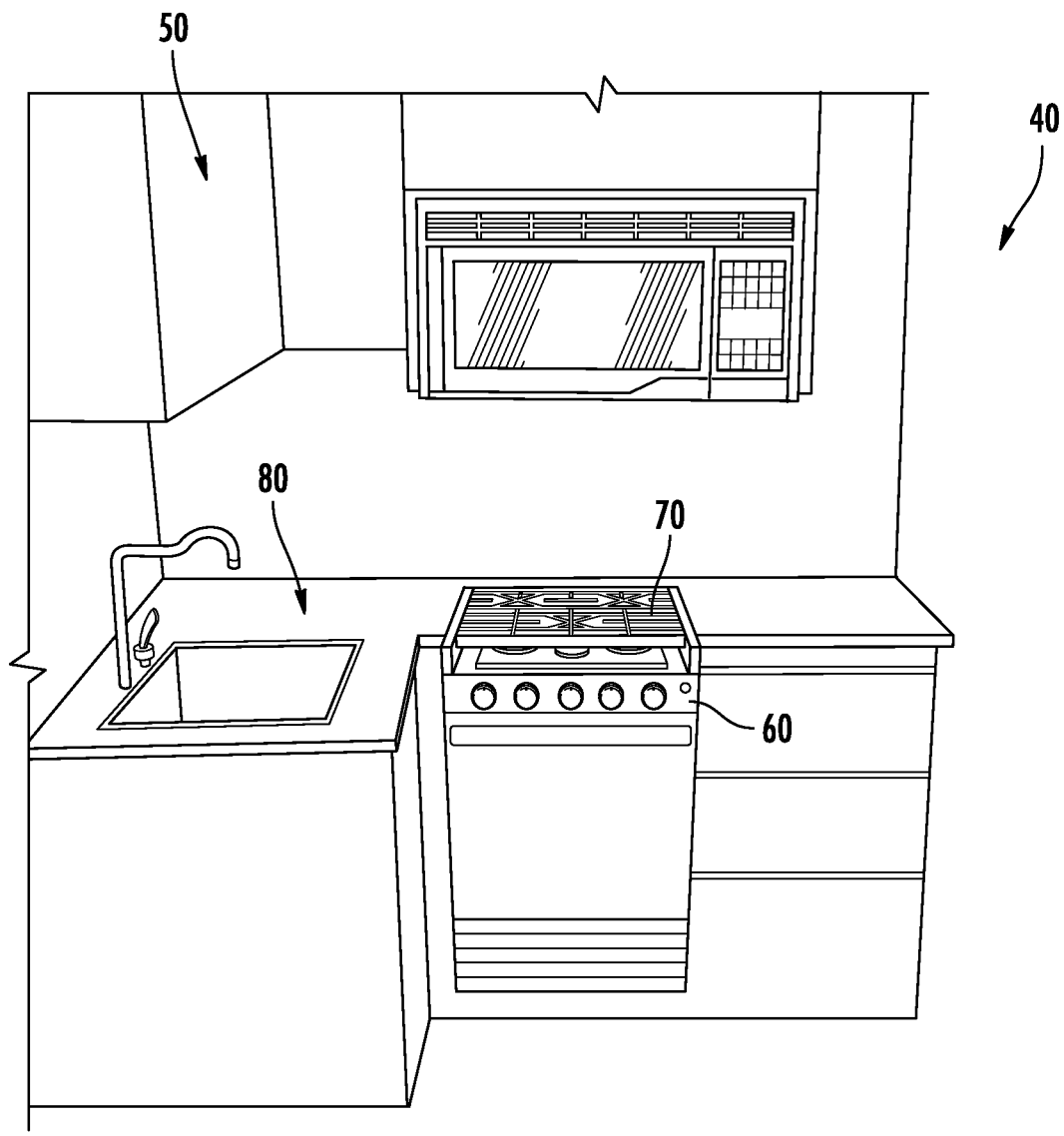
FIG. 2 provides a perspective view of an example embodiment of a kitchen within the recreational vehicle of FIG. 1 according to aspects of the present disclosure.
Figure 3:
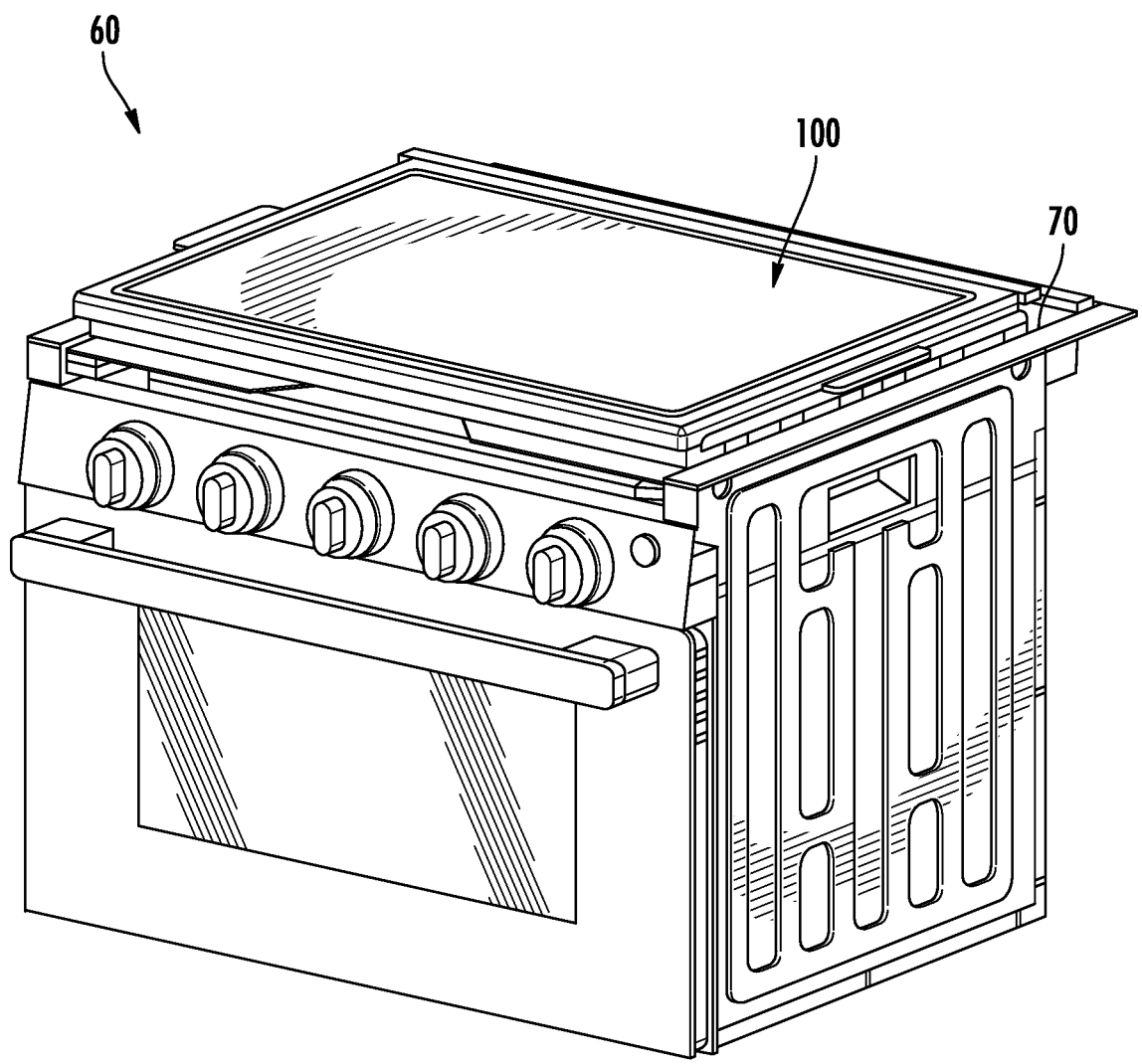
FIG. 3 provides a perspective view of an example embodiment of a range appliance within the kitchen of FIG. 2 according to aspects of the present disclosure.

As may be seen in FIGS. 2 and 3, passenger compartment 40 of recreational vehicle 20 may include a kitchen 50 for cooking, preparing, and storing food. FIG. 2 provides a perspective view of an example kitchen 50. In general, kitchen 50 may include typical household appliances, e.g., refrigerator, oven, cooktop, and a microwave. In the current example embodiment, a cooking appliance, e.g., range 60, may be included in kitchen 50. Additionally, kitchen 50 may include a countertop 80 generally configured for the receipt, storage, and preparation of food items. A cooktop 70 of range 60 may be inserted into countertop 80, e.g., cooktop 70 may be integrated into and reduce counterspace of countertop 80. In general, cooktop 70 may be an electric, or gas, cooktop with heating elements configured to provide heat to items placed thereon. Further, FIG. 3 illustrates an example embodiment of range appliance 60 and cooktop 70. In the present example embodiment, a cutting board assembly 100 is positioned on cooktop 70. In general, cutting board assembly 100 may be configured for providing counterspace on cooktop 70 of range appliance 60. In particular, cutting board assembly 100 may be generally configured for withstanding heat from heating elements of cooktop 70 in the event the heating elements were recently, or are actively, heating.

Figure 4:
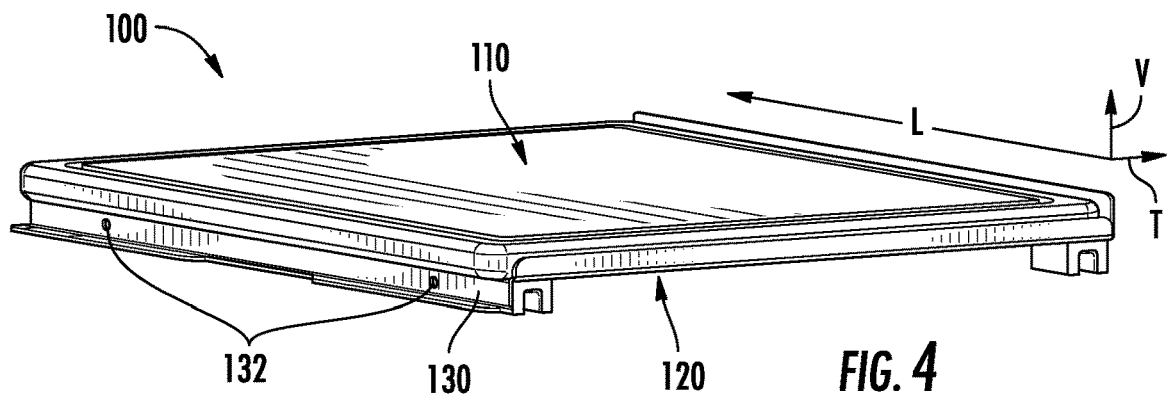
FIG. 4 provides a perspective view of an example embodiment of a cutting board assembly according to aspects of the present disclosure.

FIG. 4 illustrates an example embodiment of cutting board assembly 100 according to aspects of the present disclosure. In general, cutting board assembly may include a board 110 and a tray 120. Board 110 may be generally configured for receiving food items for preparation, and tray 120 may be generally configured for positioning atop cooktop 70 and receiving board 110. Additionally, tray 120 may include a plurality of flanges including a mounting flange 130 with a plurality of holes 132 generally configured for mounting cutting board assembly 100 within recreational vehicle 20 as will be described in more detail below. Cutting board assembly 100 may be generally configured for different size ranges or, more specifically, cooktops of various sizes. For example, cutting board assembly 100 may be up to fifty-six centimeters (56 cm) wide (in the lateral direction L), and up to fifty-three centimeters (53 cm) long (in the Transverse direction T), e.g., the area of top surface 121 of tray 120 may be no less than five hundred centimeters squared (500 sq-cm) and no greater than three thousand square centimeters 3000 sq-cm). Specifically, in one example embodiment, cutting board assembly 100 may be twenty-four centimeters (24 cm) wide by forty-one centimeters (41 cm) long or nine-hundred and eighty-four square centimeters (984 sq-cm).

Figure 5:
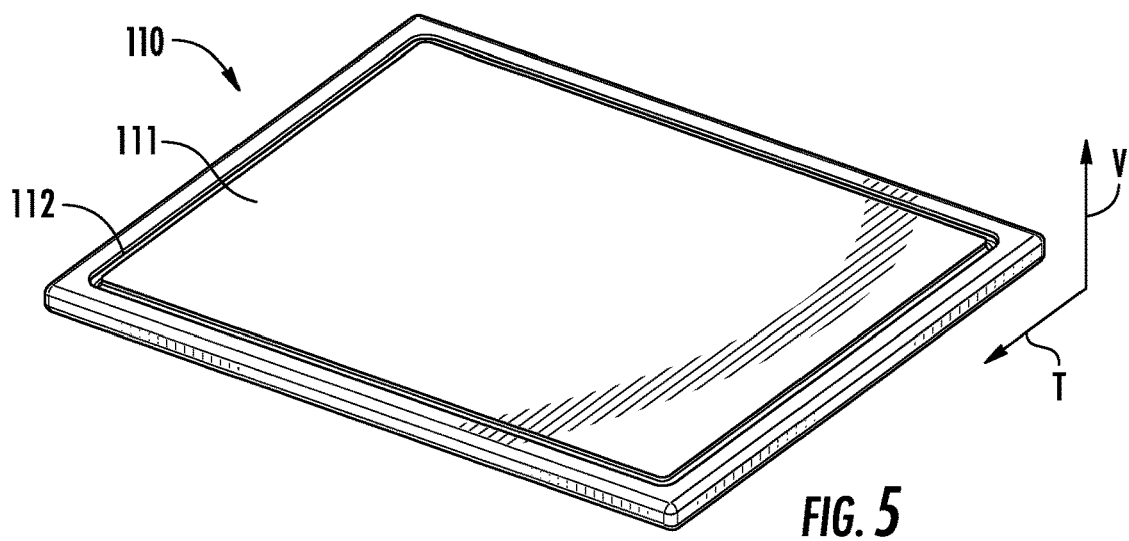
FIG. 5 provides a top, perspective view of an example embodiment of a cutting board of the cutting board assembly of FIG. 4 according to aspects of the present disclosure.
Figure 6:
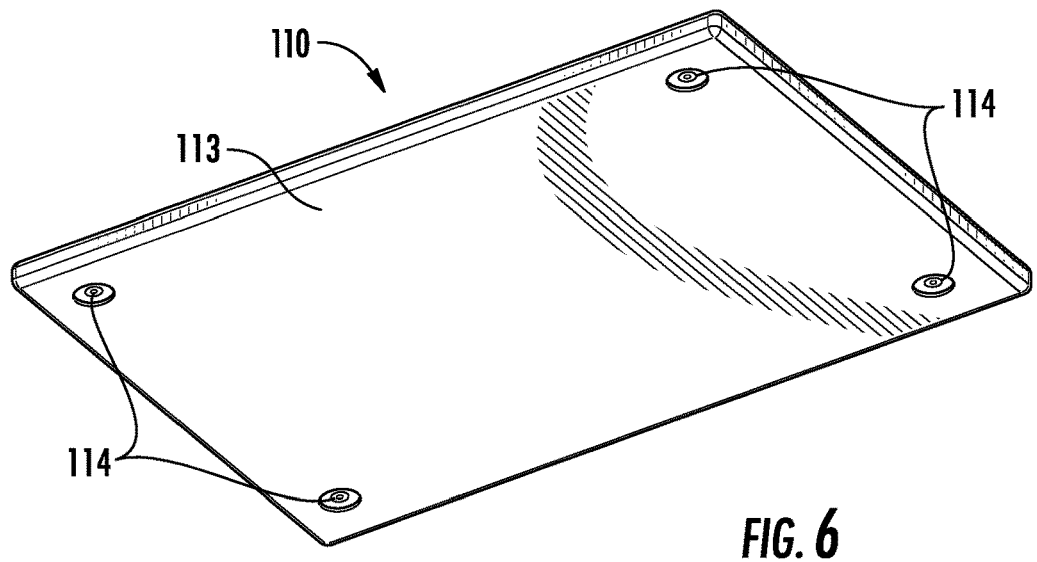
FIG. 6 provides a bottom, perspective view of an example embodiment of a cutting board of the cutting board assembly of FIG. 4 according to aspects of the present disclosure.
Figure 7:
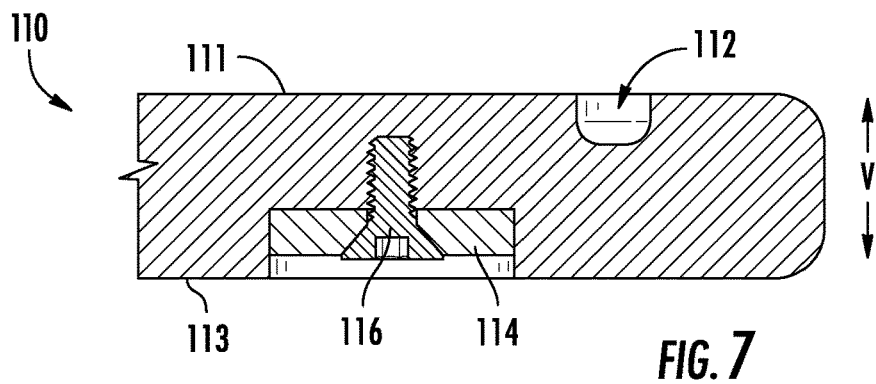
FIG. 7 provides a side, section view of the cutting board of FIG. 6 according to aspects of the present disclosure.

In general, FIGS. 5-7 illustrate an example embodiment of board 110 according to aspects of the present disclosure. Board 110 may be constructed of wood, such as bamboo or any other suitable wood, a plastic, or other suitable materials. As seen in FIG. 5, a top surface 111 of board 110 may include a groove 112 generally configured for receipt of any oils, juices, other liquids, or loose pieces of food being cut to sit and pool so as to reduce interference with the food being cut. As such, groove 112 may reduce spills while cutting, thus preventing liquids from spilling onto cooktop 70. As seen in FIG. 6, a bottom surface 113 of board 110 may include one or more of a fastener 114 generally configured for fastening board 110 to tray 120. In the current example embodiment, board 110 includes four (4) fasteners 114. One of fasteners 114 may be best seen in the section view illustrated in FIG. 7. In general, fastener 114 may be a magnet coupled at bottom surface 113 of board 110. A screw 116 or any other suitable fastener, e.g., adhesive, may be generally configured to couple fastener 114 to board 110.

Figure 8:
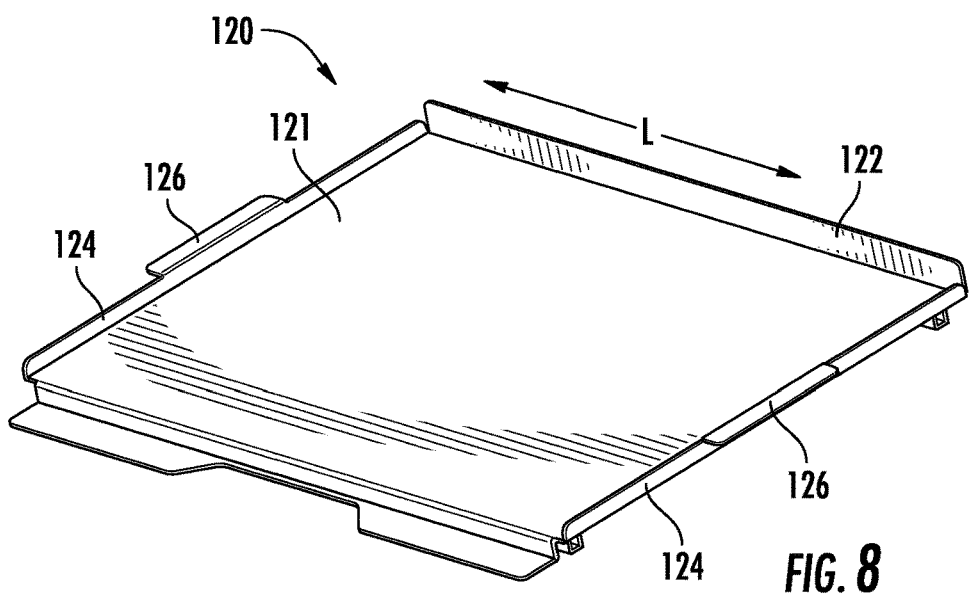
FIG. 8 provides a top, perspective view of a tray of the cutting board assembly of FIG. 4 according to aspects of the present disclosure.
Figure 9:
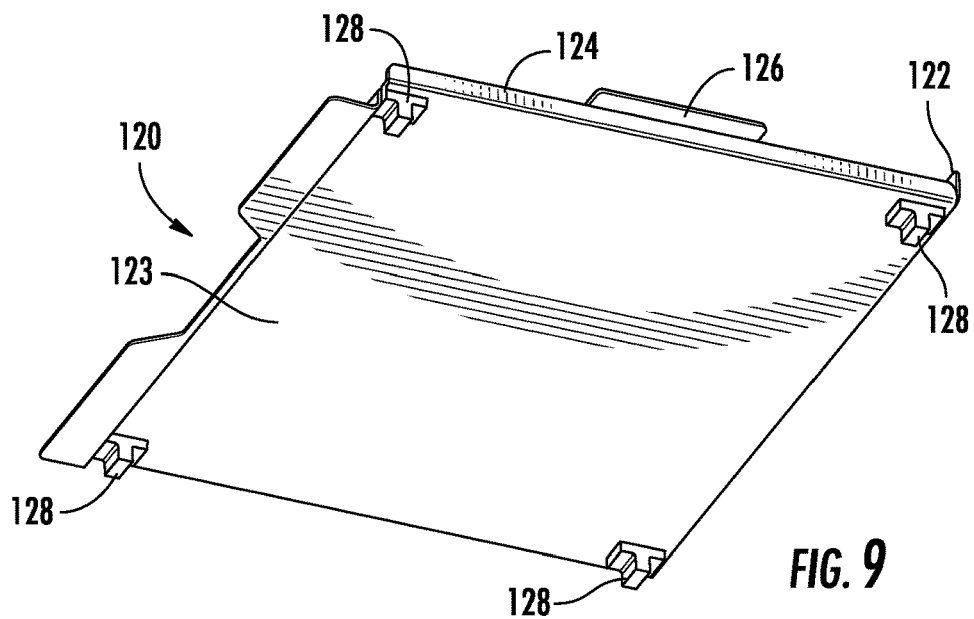
FIG. 9 provides a bottom, perspective view of the tray of FIG. 8 according to aspects of the present disclosure.

In general, FIGS. 8-9 illustrate an example embodiment of tray 120 according to aspects of the present disclosure. Tray 120 may be constructed of metal, such as stainless steel or any other suitable metal. In general, bottom surface 113 of board 110 faces a top surface 121 of metal tray 120 and an area of top surface 121 of the metal tray may be greater than an area of the bottom surface 113 of board 110. Thus, tray 120 may be larger than board 110, e.g., in order to advantageously protect board 110 from heating by elements of cooktop 70.

Top surface 121 of tray 120 may include a back flange 122 and side flanges 124. Back flange 122 and side flanges 124 may be generally configured for preventing any oils, juices, other liquids, or loose pieces of food being cut from spilling while using cutting board assembly 100, e.g., preventing liquids from spilling onto cooktop 70. Side flanges 124 may also include handles 126 extending from side flanges 124. Handles 126 may be generally configured for providing easy grab positions for a user to grab and move cutting board assembly 100 as desired. Generally, when board 110 is mounted to metal tray 120 and the cutting board assembly 100 is positioned on the cooking appliance, e.g., cooktop 70, metal tray 120 may be positioned between board 110 and heating elements of the cooking appliance. Thus, tray 120 may advantageously protect board 110 from heating by elements of cooktop 70.

As seen in FIG. 9, a bottom surface 123 of tray 120 may include one or more feet 128 generally configured for positioning tray 120 on cooktop 70. Feet 128 may be made of silicon or any other material suitable for withstanding heat from cooktop 70. In the current example embodiment, tray 120 includes four (4) silicon feet 128. In general, feet 128 may be coupled at bottom surface 123 by any suitable fastener, e.g., adhesive. Feet 120 may extend to a grill, panel, or other feature of cooktop 70.

In the current example embodiment, cutting board assembly 100 may include a bamboo board 110 with a groove 112 on top surface 111 and four (4) magnets 114 attached via screws 116 at bottom surface 113. Board 110 may be coupled to tray 120 that includes back flange 122, side flanges 124, and handles 126 at top surface 121 as well as four (4) feet 128 at bottom surface 123. In other example embodiments, as would be understood by one of skill in the art, other materials of board 110 may be used in combination with other types of fasteners 114 to secure board 110 to tray 120. Additionally, in other example embodiments, other materials of tray 120 may be used in combination with other types of feet 128 and the current example embodiment and description of cutting board assembly 100 is not meant to be limiting to this specific configuration.

Figure 10:
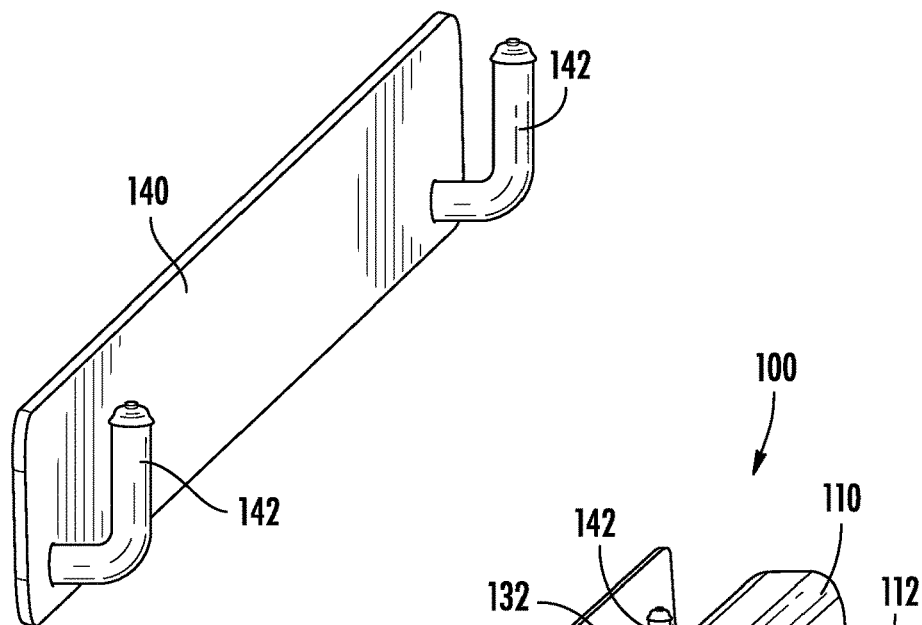
FIG. 10 provides a perspective view of an example embodiment of a hook according to aspects of the present disclosure.
Figure 11:
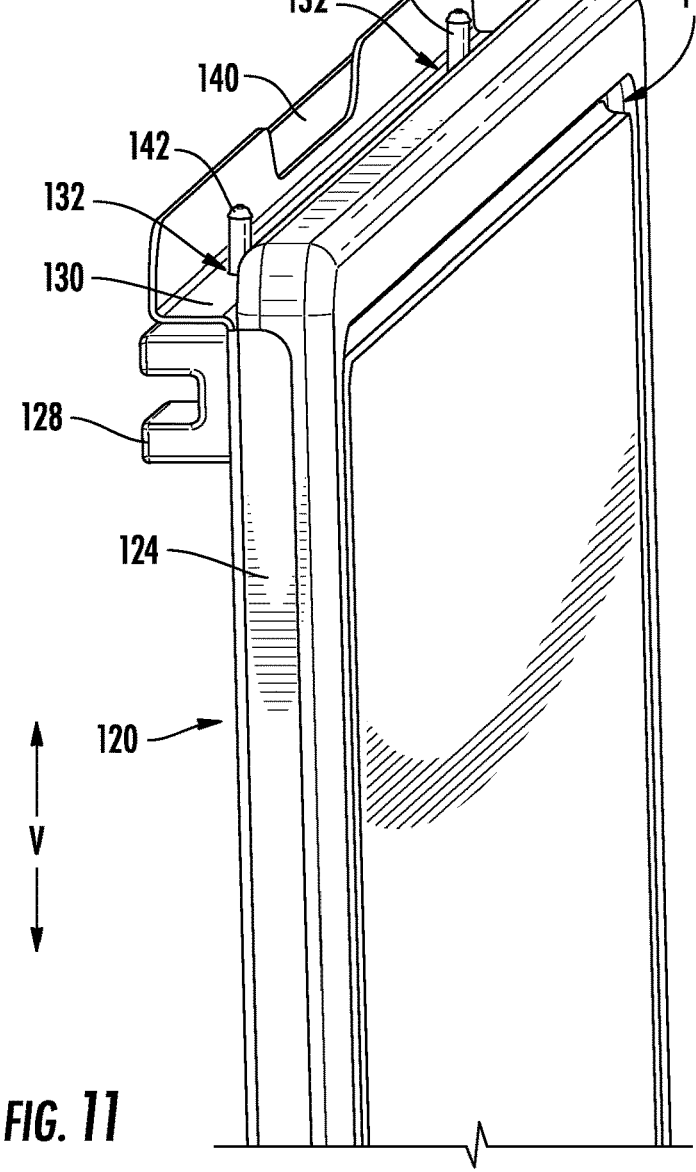
FIG. 11 provides a perspective view of the cutting board assembly of FIG. 4 mounted at the hook of FIG. 10 according to aspects of the present disclosure.

In general, FIGS. 10 and 11 provide a perspective view of a wall bracket 140 generally configured to removably couple cutting board assembly 100 to the recreational vehicle for storage while traveling or otherwise not in use. As may be seen in FIG. 10, wall bracket 140 may include one or more hooks 142. Hooks 142 may be generally configured for engaging with holes 132 of mounting flange 130. As may be seen in FIG. 11, cutting board assembly 100 may mount vertically to hooks 142 of wall bracket 140 via holes 132 of mounting flange 130. As such, cutting board assembly 100 may be removably mountable to any wall within recreational vehicle 20, including kitchen 50, wall-space permitting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cutting board assembly for a recreational vehicle, the recreational vehicle comprising a wall and a wall bracket mounted to the wall, the cutting board assembly comprising:
   a metal tray;
   a board selectively mountable to the metal tray such that a bottom surface of the board faces a top surface of the metal tray; and
   an L-shaped mounting flange extending from the metal tray, the L-shaped mounting flange defining a plurality of holes, wherein the L-shaped mounting flange of the cutting board assembly is configured to couple to the wall bracket of the recreational vehicle, the plurality of holes located on a leg of the L-shaped mounting flange orthogonal to the top surface of the metal tray,
   wherein an area of the top surface of the metal tray is greater than an area of the bottom surface of the board, and
   wherein, when the board is mounted to the metal tray and the cutting board assembly is positioned on a cooking appliance, the metal tray is positioned between the board and a heating element of the cooking appliance.

2. The cutting board assembly of claim 1, wherein the metal tray comprises a plurality of feet positioned at a bottom surface of the metal tray, the plurality of feet extending to the cooking appliance when the cutting board assembly is positioned on the cooking appliance.

3. The cutting board assembly of claim 2, wherein the plurality of feet are silicon feet.

4. The cutting board assembly of claim 1, wherein the metal tray comprises a plurality of flanges, each of the plurality of flanges extending upwardly from the top surface of the metal tray at a respective side of the top surface of the metal tray, the board received between the plurality of flanges when the board is mounted to the metal tray.

5. The cutting board assembly of claim 1, wherein the board is a wooden board comprising bamboo.

6. The cutting board assembly of claim 1, wherein the metal tray is a steel tray.

7. The cutting board assembly of claim 1, further comprising a plurality of fasteners selectively coupling the board to the metal tray.

8. The cutting board assembly of claim 7, wherein the fasteners comprise magnets coupled to the board at the bottom surface of the board, the magnets configured to engage with the metal tray.

9. The cutting board assembly of claim 1, wherein the area of the top surface of the metal tray is no less than five hundred centimeters squared and no greater than three thousand square centimeters.

10. A cutting board assembly configured to position atop a cooktop appliance in a recreational vehicle, the recreational vehicle comprising a wall and a wall bracket mounted to the wall, the cutting board assembly comprising:
    a metal tray configured to be positioned on the cooktop appliance and to withstand heat from the cooktop appliance;
    a board selectively mountable to the metal tray such that a bottom surface of the board faces a top surface of the metal tray; and
    an L-shaped mounting flange extending from the metal tray, the L-shaped mounting flange defining a plurality of holes, wherein the L-shaped mounting flange of the cutting board assembly is configured to couple to the wall bracket of the recreational vehicle, the plurality of holes located on a leg of the L-shaped mounting flange orthogonal to the top surface of the metal tray,
    wherein an area of the top surface of the metal tray is greater than an area of the bottom surface of the board, and
    wherein, when the board is mounted to the metal tray and the cutting board assembly is positioned on the cooking appliance, the metal tray is positioned between the board and a heating element of the cooking appliance.

11. The cutting board assembly of claim 10, wherein the metal tray comprises a plurality of feet positioned at a bottom surface of the metal tray, the plurality of feet extending to the cooktop appliance when the cutting board assembly is positioned on the cooktop appliance.

12. The cutting board assembly of claim 11, wherein the plurality of feet are silicon feet.

13. The cutting board assembly of claim 10, wherein the metal tray comprises a plurality of flanges, each of the plurality of flanges extending upwardly from the top surface of the metal tray at a respective side of the top surface of the metal tray, the board received between the plurality of flanges when the board is mounted to the metal tray.

14. The cutting board assembly of claim 10, wherein the board is a wooden board comprising bamboo.

15. The cutting board assembly of claim 10, wherein the metal tray is a steel tray.

16. The cutting board assembly of claim 10, further comprising a plurality of fasteners selectively coupling the board to the metal tray.

17. The cutting board assembly of claim 16, wherein the fasteners comprise magnets coupled to the board at the bottom surface of the board, the magnets configured to engage with the metal tray.

18. The cutting board assembly of claim 10, wherein the area of the top surface of the metal tray is no less than five hundred centimeters squared and no greater than three thousand square centimeters.

* * * * *